United States Patent
Hasumi et al.

(10) Patent No.: US 7,222,328 B2
(45) Date of Patent: May 22, 2007

(54) SEMICONDUCTOR INTEGRATED CIRCUIT DESIGN TOOL, COMPUTER IMPLEMENTED METHOD FOR DESIGNING SEMICONDUCTOR INTEGRATED CIRCUIT, AND METHOD FOR MANUFACTURING SEMICONDUCTOR INTEGRATED CIRCUIT

(75) Inventors: Ryoji Hasumi, Kanagawa (JP); Masaaki Iwai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/200,263

(22) Filed: Aug. 10, 2005

(65) Prior Publication Data

US 2006/0038171 A1    Feb. 23, 2006

(30) Foreign Application Priority Data

Aug. 12, 2004    (JP)    ............................. 2004-235528

(51) Int. Cl.
   *G06F 17/50*    (2006.01)
   *H01L 21/00*    (2006.01)
(52) U.S. Cl. ........................................ 716/21; 438/197
(58) Field of Classification Search ................. 716/21; 438/197
   See application file for complete search history.

(56) References Cited

U.S. PATENT DOCUMENTS

| | | | | |
|---|---|---|---|---|
| 5,655,110 A | * | 8/1997 | Krivokapic et al. | .......... 716/19 |
| 6,232,189 B1 | * | 5/2001 | Yi et al. | .................... 438/301 |
| 6,323,113 B1 | * | 11/2001 | Gabriel et al. | ............. 438/584 |
| 6,581,028 B1 | * | 6/2003 | Hayashi | ..................... 703/13 |
| 6,697,697 B2 | * | 2/2004 | Conchieri et al. | .......... 700/121 |
| 6,807,655 B1 | * | 10/2004 | Rehani et al. | ................ 716/4 |
| 2002/0063572 A1 | * | 5/2002 | Yamaguchi et al. | ........ 324/769 |
| 2002/0182757 A1 | * | 12/2002 | Conchieri et al. | .......... 700/121 |

FOREIGN PATENT DOCUMENTS

JP    10-200109 A    7/1998

* cited by examiner

*Primary Examiner*—Evan Pert
(74) *Attorney, Agent, or Firm*—Foley & Lardner LLP

(57) ABSTRACT

A semiconductor integrated circuit design tool includes a reference data defining module configured to define design data of one of a plurality of transistors implementing the semiconductor integrated circuit as reference data, a simulator configured to simulate each effective channel length of the transistors, based on the design data and a reference channel length based on the reference data, and an adjuster configured to adjust gate lengths of gate electrodes of the transistors to reduce a difference between the effective channel length and the reference channel length.

17 Claims, 16 Drawing Sheets

SEMICONDUCTOR INTEGRATED CIRCUIT DESIGN TOOL, COMPUTER IMPLEMENTED METHOD FOR DESIGNING SEMICONDUCTOR INTEGRATED CIRCUIT, AND METHOD FOR MANUFACTURING SEMICONDUCTOR INTEGRATED CIRCUIT

CROSS REFERENCE TO RELATED APPLICATIONS AND INCORPORATION BY REFERENCE

This application is based upon and claims the benefit of priority from prior Japanese Patent Application P2004-235528 filed on Aug. 12, 2004; the entire contents of which are incorporated by reference herein.

BACKGROUND OF THE INVENTION

1. Field of the Invention

The present invention relates to design process for a semiconductor integrated circuit and in particular to a semiconductor integrated circuit design tool, a computer implemented method for designing a semiconductor integrated circuit, and a method for manufacturing a semiconductor integrated circuit.

2. Description of the Related Art

In a manufacturing process of a semiconductor integrated circuit, unifying electrical characteristics of a plurality of transistors is a crucial factor to improve the defect rate. To unify the electrical characteristics of insulated gate transistors such as the MOS transistors, variability of gate electrode lengths caused by the optical proximity effect (OPE) and the loading effect should be eliminated. In Japanese Patent Laid-Open Publication No. Hei 10-200109, a method to reduce such variability of the gate electrode lengths by disposing dummy patterns around the gate electrode pattern in a photomask is proposed.

However, even though the variability of the gate electrode lengths is reduced at the mask level, the effective channel lengths of the transistors may vary dependent on the surface area of the impurity region formed by the ion implantation process, since such effective channel lengths depend on the diffusion of the dopants by the annealing process. Such effective channel length variability leads the electrical characteristics per unit channel length to unevenness. When the number of the doped dopants and the number of point defects in the impurity regions are varied dependent on the surface area of the impurity regions, such effective channel length variability generates. In addition, when the decay time of the point defects are affected by the volume restriction of the impurity region surrounded by a trench isolation region, the diffusion of the doped dopants by the annealing process becomes uneven in the semiconductor substrate.

SUMMARY OF THE INVENTION

An aspect of present invention inheres in a semiconductor integrated circuit design tool according to an embodiment of the present invention. The tool includes a reference data defining module configured to define design data of one of a plurality of transistors implementing the semiconductor integrated circuit as reference data. A simulator is configured to simulate each effective channel length of the transistors based on the design data and a reference channel length based on the reference data. An adjuster is configured to adjust gate lengths of gate electrodes of the transistors to reduce a difference between the effective channel length and the reference channel length.

Another aspect of the present invention inheres in a computer implemented method for designing semiconductor integrated circuit according to the embodiment of the present invention. The method includes defining design data of one of transistors implementing the semiconductor integrated circuit as reference data, simulating each effective channel length of the transistors based on the design data and a reference channel length based on the reference data, and adjusting gate lengths of gate electrodes of the transistors to reduce a difference between the effective channel length and the reference channel length.

Yet another aspect of the present invention inheres in a method for manufacturing the semiconductor integrated circuit according to the embodiment of the present invention. The method includes forming a gate insulator on a semiconductor substrate, depositing a conductive layer on the gate insulator, coating a resist film on the conductive layer, and projecting an image of a photomask onto the resist film to form etching masks on the conductive layer. The photomask has patterns of gate electrodes of which gate lengths are adjusted to reduce a difference between effective channel lengths of transistors implementing the semiconductor integrated circuit, based on designed lengths and designed surface areas of diffusion regions of the transistors. The method also includes etching the conductive layer by using the etching masks to form the gate electrodes, doping dopants into the semiconductor substrate using the gate electrodes as a doping mask, and annealing the semiconductor substrate to activate the dopants to form the diffusion regions in the semiconductor substrate.

DETAILED DESCRIPTION OF THE INVENTION

Figure 1:
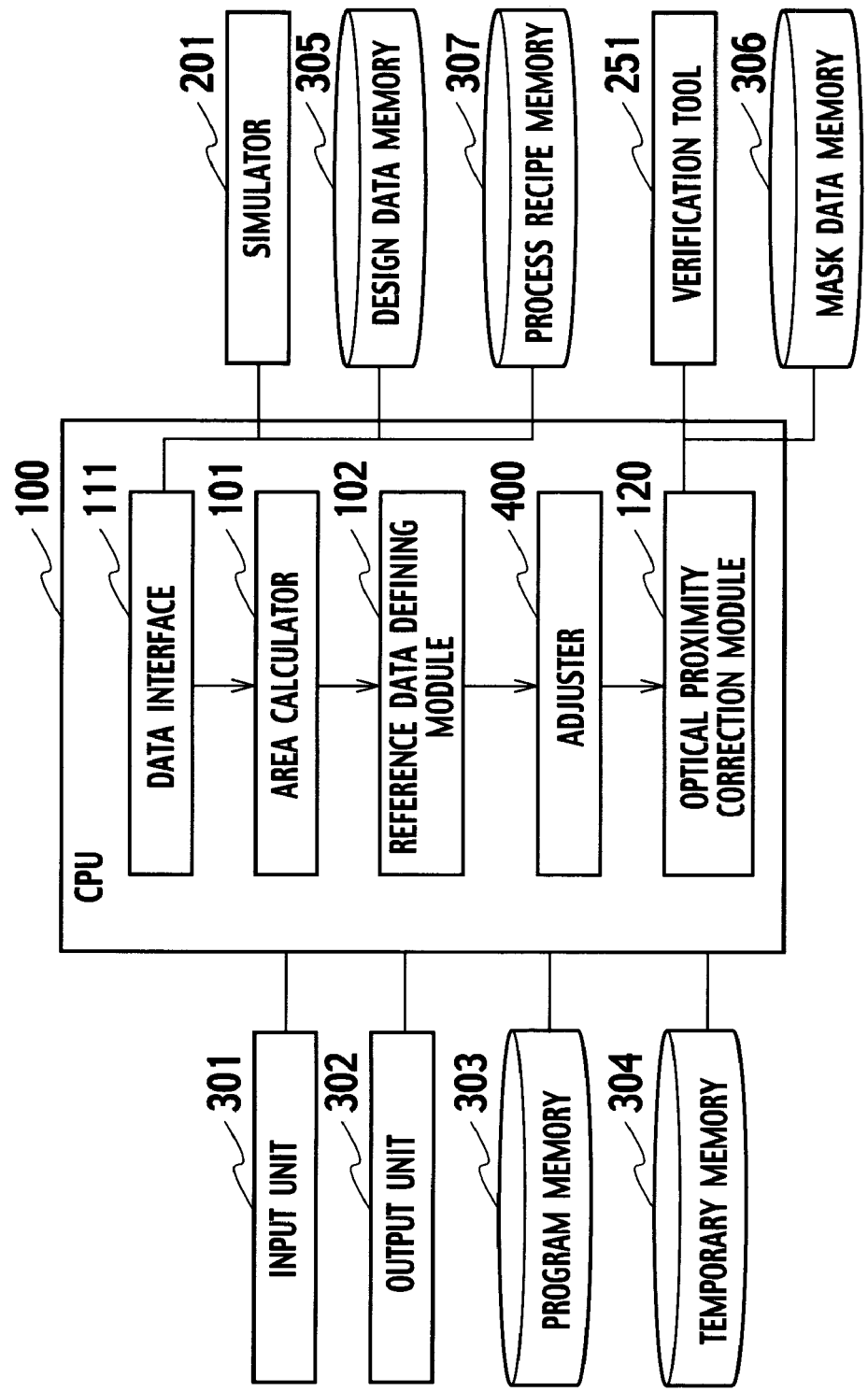
FIG. 1 is a diagram of a semiconductor integrated circuit design tool in accordance with an embodiment of the present invention.

An embodiment of the present invention will be described with reference to the accompanying drawings. It is to be noted that the same or similar reference numerals are applied to the same or similar parts and elements throughout the drawings, and the description of the same or similar parts and elements will be omitted or simplified.

With reference to FIG. 1, a semiconductor integrated circuit design tool in accordance with an embodiment of the present invention includes a central processing unit (CPU) 100 and a simulator 201 connected to the CPU 100. The CPU 100 includes a reference data defining module 102 and an adjuster 400. The reference data defining module 102 is configured to define design data of one of the plurality of transistors implementing the semiconductor integrated circuit as reference data. The simulator 201 is configured to simulate each effective channel length of the transistors based on the plurality of design data. Also, the simulator 201 is configured to simulate a reference channel length based on the reference data. The adjuster 400 is configured to adjust the gate lengths of the gate electrodes of the transistors to reduce a significant difference between the effective channel length and the reference channel length.

The semiconductor integrated circuit design tool further includes a design data memory 305, a mask data memory 306, a process recipe memory 307, a simulator 201, a verification tool 251, an input unit 301, an output unit 302, a program memory 303, and a temporary memory 304. The CPU 100 further includes a data interface 111 an area calculator 101, and an optical proximity correction module 120.

Figure 2:
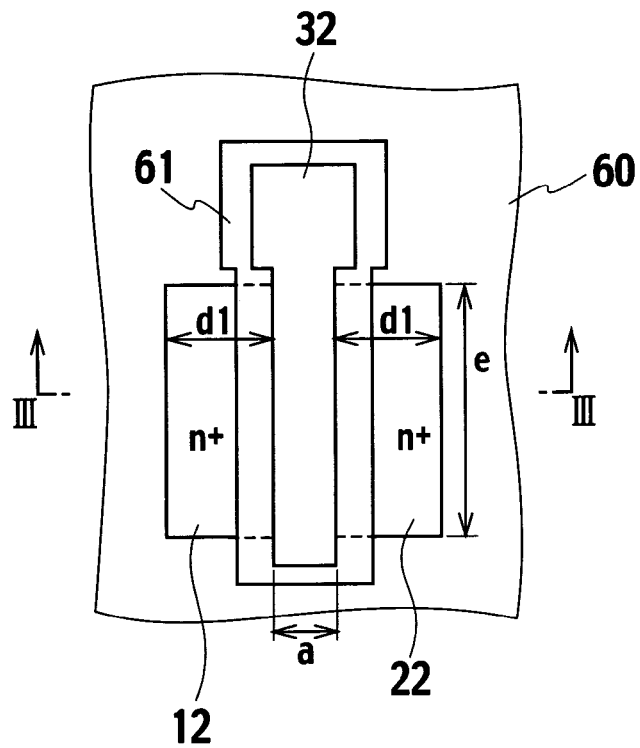
FIG. 2 is a first design data of a transistor in accordance with the embodiment of the present invention.
Figure 4:
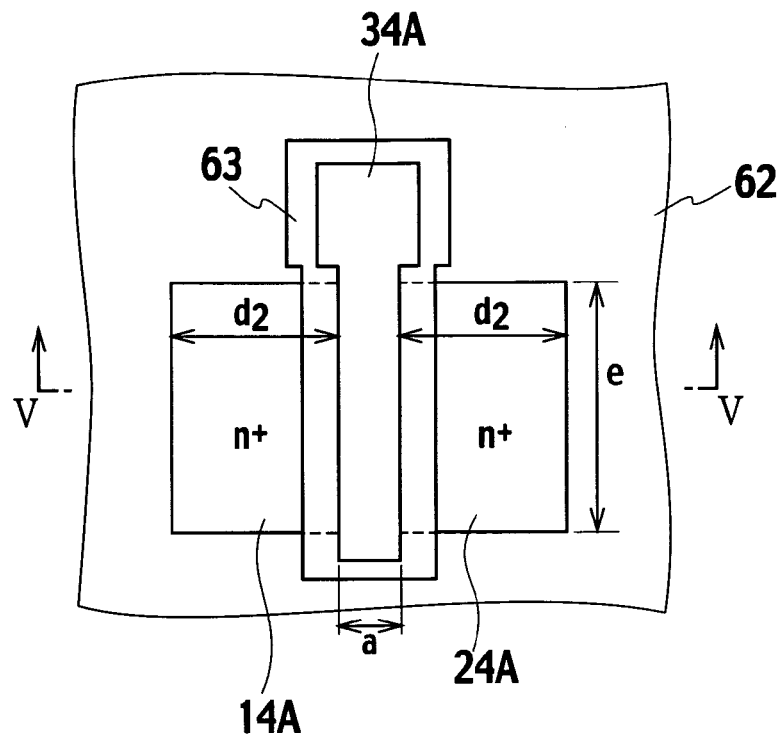
FIG. 4 is a second design data of the transistor in accordance with the embodiment of the present invention.

Here, the design data memory 305 stores the plurality of design data of the semiconductor integrated circuits containing the transistors. Examples of the plurality of design data of transistors stored in the design data memory 305 are shown in FIGS. 2 and 4. In FIG. 2, the design data of a first n-channel transistor includes a gate electrode 32, a first $n^+$ diffusion region 12, and a second $n^+$ diffusion region 22. The gate electrode 32 is interposed between the first and the second $n^+$ diffusion regions 12 and 22. The first and second $n^+$ diffusion regions 12 and 22 are surrounded by a trench isolation region 60. Also, an insulating sidewall spacer 61 is disposed on the sidewalls of the gate electrode 32. In FIG. 4, the design data of a second n-channel transistor includes a gate electrode 34A, a first $n^+$ diffusion region 14A, and a second $n^+$ diffusion region 24A. The gate electrode 34A is interposed between the first and second $n^+$ diffusion regions 14A and 24A. The first and second $n^+$ diffusion regions 14A and 24A are surrounded by a trench isolation region 62. An insulating sidewall spacer 63 is disposed on the sidewalls of the gate electrode 34A.

The gate length "a" of the gate electrode 32 included in the first n-channel transistor shown in FIG. 2 is equal to the gate length "a" of the gate electrode 34A included in the second n-channel transistor shown in FIG. 4. Also, each gate width "e" of the first and second n+ diffusion regions 12 and 22 shown in FIG. 2, in the direction parallel to the longitudinal direction of the gate electrodes 32, is equal to each gate width "e" of the first and second $n^+$ diffusion regions 14A and 24A shown in FIG. 4. However, each length "$d_2$" of the first and second $n^+$ diffusion regions 14A and 24A in a gate length direction shown in FIG. 4 is longer than each length "$d_1$" of the first and second $n^+$ diffusion regions 12 and 22 shown in FIG. 2.

With reference again to FIG. 1, the data interface 111 is configured to fetch the plurality of design data of the plurality of transistors from the design data memory 305. The area calculator 101 is configured to calculate surface areas of the diffusion regions in the transistors by using the design data fetched by the data interface 111. For example, the surface area of each of the first and second $n^+$ diffusion regions 12 and 22 in the first n-channel transistor shown in FIG. 2 is "$d_1 * e$", and the surface area of each of the first and second n+ diffusion regions 14A and 24A in the second n-channel transistor shown in FIG. 4 is "$d_2 * e$".

The reference data defining module 102 shown in FIG. 1 classifies the plurality of design data by the length of the diffusion region in the gate length direction. Further, the reference data defining module 102 defines the design data of the transistor of which the length of the diffusion region in the gate length direction is the shortest as the reference data. For example, if the design data of the first n-channel transistor shown in FIG. 2 and the design data of the second n-channel transistor shown in FIG. 4 are stored in the design data memory 305, the reference data defining module 102 defines the design data of the first n-channel transistor shown in FIG. 2 as the reference data since the length "$d_1$" is shorter than the length "$d_2$".

The process recipe memory 307 shown in FIG. 1 stores process recipes used for manufacturing each of the plurality of transistors. The process recipes contain conditions for an ion implantation process for forming the diffusion regions of the transistors such as acceleration energy "$E_{ac}$" and dose. The process recipes also contain conditions for an annealing process that is carried out after the ion implantation process.

The simulator 201 simulates the structure of the manufactured transistor by using process analysis methods, such as implantation models based on the Monte Carlo method and diffusion models based on the dynamic Monte Carlo method by using the design data of the transistors stored in the design data memory 305 and the process recipes stored in the process recipe memory 307.

Figure 3:
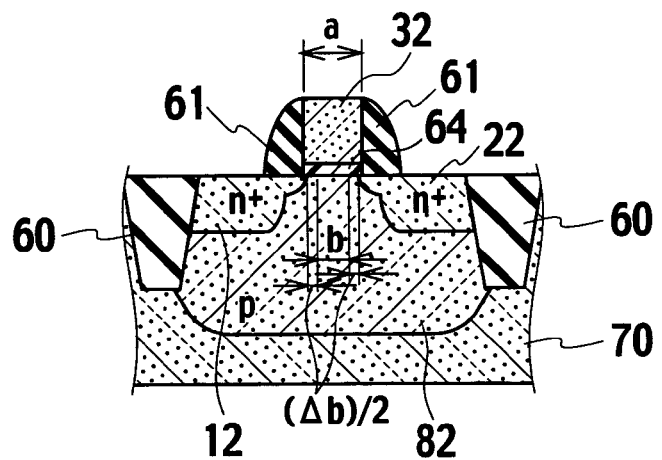
FIG. 3 is a first cross sectional view of the transistor in accordance with the embodiment of the present invention.

FIG. 3 is a sectional view taken on line III—III in FIG. 2. FIG. 3 shows the structure of the first n-channel transistor simulated by the simulator 201 shown in FIG. 1. Such structure shown in FIG. 3 is simulated based on the conditions for the ion implantation and the subsequent annealing processes for manufacturing the first n-channel transistor stored in the process recipe memory 307 and the design data of the first n-channel transistor shown in FIG. 2.

Figure 5:
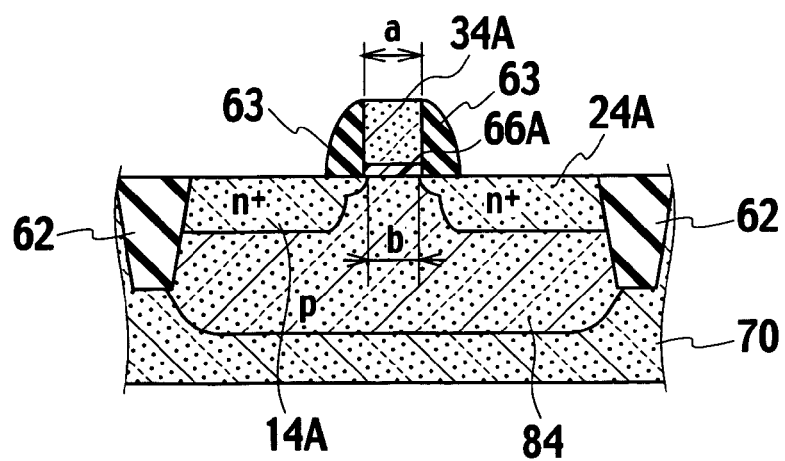
FIG. 5 is a second cross sectional view of the transistor in accordance with the embodiment of the present invention.

FIG. 5 is a sectional view taken on line V—V in FIG. 4. FIG. 5 shows the structure of the second n-channel transistor simulated by the simulator 201 shown in FIG. 1. Such structure shown in FIG. 5 is simulated based on the conditions for the ion implantation and the subsequent annealing processes for manufacturing the second n-channel transistor stored in the process recipe memory 307 and the design data of the second n-channel transistor shown in FIG. 4.

The first n-channel transistor shown in FIG. 3 includes a semiconductor substrate 70, the trench isolation region 60 provided in the semiconductor substrate 70, a p-well 82 provided in the semiconductor substrate 70 in the region surrounded by the trench isolation region 60, a gate insulator 64 disposed on the p-well 82, the gate electrode 32 disposed on the gate insulator 64, the insulating sidewall spacer 61 disposed on the sidewall of the gate electrode 32, and the first and second n$^+$ diffusion regions 12 and 22 self aligned in the p-well 82 by the gate electrode 32.

The second n-channel transistor shown in FIG. 5 includes the semiconductor substrate 70, the trench isolation region 62 provided in the semiconductor substrate 70, a p-well 84 provided in the semiconductor substrate 70 in the region surrounded by the trench isolation region 62, a gate insulator 66A disposed on the p-well 84, the gate electrode 34A disposed on the gate insulator 66A, the insulating sidewall spacer 63 disposed on the sidewalls of the gate electrode 34A, and the first and second n$^+$ diffusion regions 14A and 24A self aligned in the p-well 84 by the gate electrode 34A.

As shown in FIGS. 3 and 5, the gate length "a" of the gate electrodes 32 included in the first n-channel transistor is equal to the gate length "a" of the gate electrodes 34A included in the second n-channel transistors at the mask level. However, the surface area of the p-well 82 in the first n-channel transistor shown in FIG. 3, to which n-type dopants such as phosphorus (P$^+$) and arsenic (As$^+$) are doped, is smaller than the surface area of the p-well 84 in the second n-channel transistor shown in FIG. 5. Therefore, the total number of the n-type dopants doped into the p-well 82 shown in FIG. 3 and the number of point defects in the p-well 82 are smaller than the total number of the n-type dopants doped into the p-well 84 shown in FIG. 5 and the number of the point defects in the p-well 84, respectively.

Figure 6:
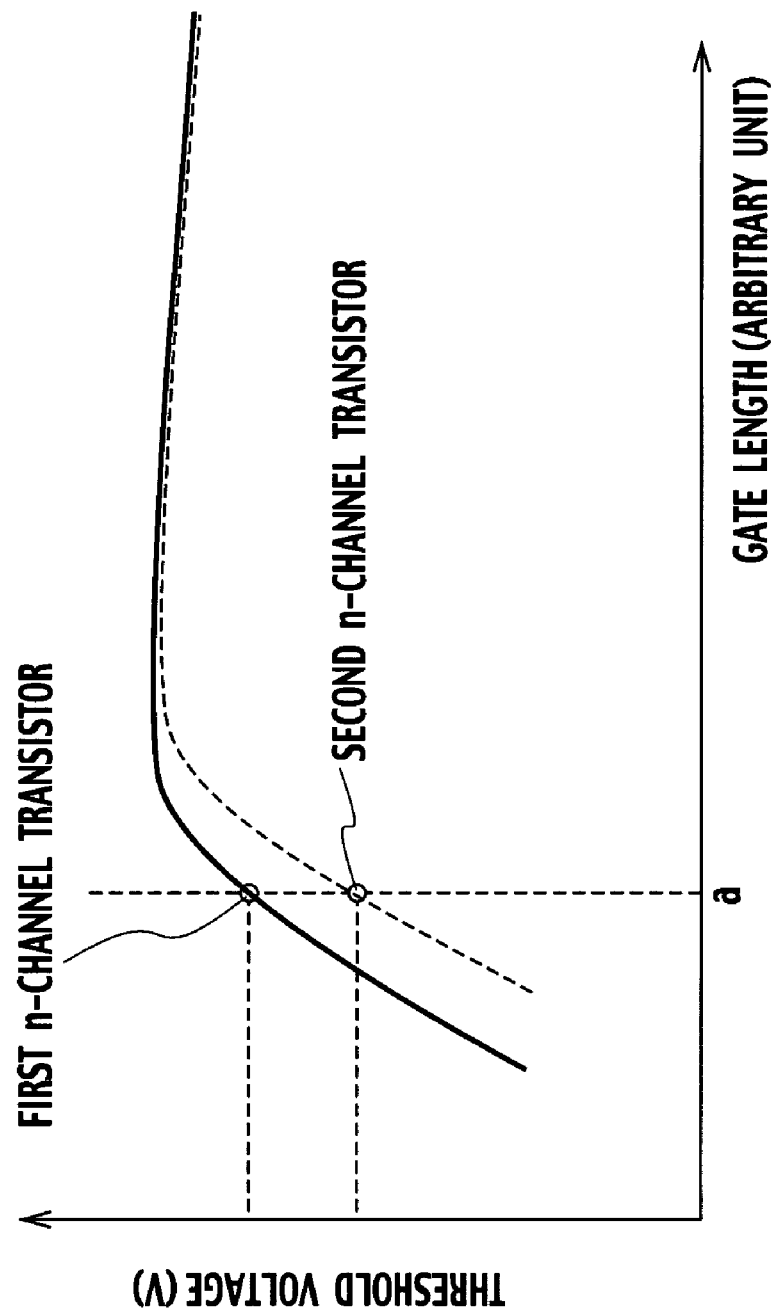
FIG. 6 is a first sample graph showing a threshold voltage of the transistor in accordance with the embodiment of the present invention.

Accordingly, the diffusion of the n-type dopants in the p-well 82 of the first n-channel transistor shown in FIG. 3 is reduced as compared to the diffusion of the n-type dopants in the p-well 84 of the second n-channel transistor shown in FIG. 5. So, in the case where the effective channel length of the second n-channel transistor is "b", the effective channel length of the first n-channel transistor is longer by "(Δb)/2" on each side of the gate electrode 32 in comparison with the effective channel length "b". Therefore, the effective channel length of the first n-channel transistor is "b+Δb". As a result, from the point of view of the electrical characteristics of the first and second n-channel transistors, the difference between the threshold voltages of the first and second n-channel transistors is generated as shown in FIG. 6. Consequently, the first and second n-channel transistors have different characteristic in the short channel effect and the leakage current, for example.

With reference again to FIG. 1, the adjuster 400 compares the reference channel length and each of the effective channel lengths. Such reference channel length is simulated by the simulator 201 based on the reference data, the conditions for the ion implantation process, and the conditions for the annealing process. Also, each of the effective channel lengths is simulated by the simulator 201 based on each of the plurality of design data, the conditions for the ion implantation process, and the conditions for the annealing process. In addition, the adjuster 400 judges that there is a significant difference if the difference between the reference channel length and each of the channel lengths is 5% or more, for example. Further, the adjuster 400 adjusts the gate lengths of the gate electrode patterns included in the design data of this transistors to reduce the significant difference. For example, the adjuster 400 increases the gate length by 5% to 10%. Also, the adjuster 400 transfers the adjusted design data to the simulator 201. The adjuster 400 determines whether or not a significant difference between the effective channel length of the transistor of which the structure is simulated by the simulator 201 based on the adjusted design data and the reference channel length still exists. If a significant difference still exists, the adjustments of the gate length are further repeated.

Figure 7:
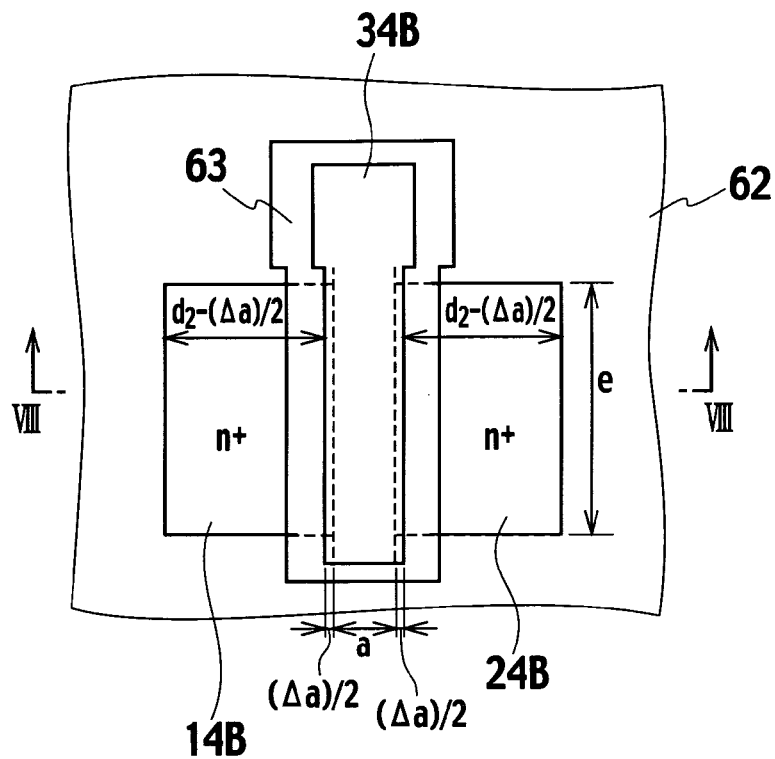
FIG. 7 is a third design data of the transistor in accordance with the embodiment of the present invention.

FIG. 7 shows the design data of the second n-channel transistor adjusted by the adjuster 400. The adjusted design data of the second n-channel transistor has a gate electrode 34B, a first n$^+$ diffusion region 14B and a second n$^+$ diffusion region 24B. The gate electrode 34B is interposed between the first and second n$^+$ diffusion region 14B and 24B. The first and second n$^+$ diffusion regions 14B and 24B are surrounded by the trench isolation 62. The insulating sidewall spacer 63 is disposed on the sidewalls of the gate electrode 34B. Here, the gate length of the gate electrode 34A shown in FIG. 4 is increased in the directions of the first and second n+ diffusion regions 14A and 24A by "(Δa)/2" for each direction through the adjustment. As a result, the gate electrode 34B has the gate length of "a+Δa" as shown in FIG. 7. Meanwhile, each of the first and second n$^+$ diffusion regions 14B and 24B has the length of "d$_2$−(Δa)/2".

Figure 8:
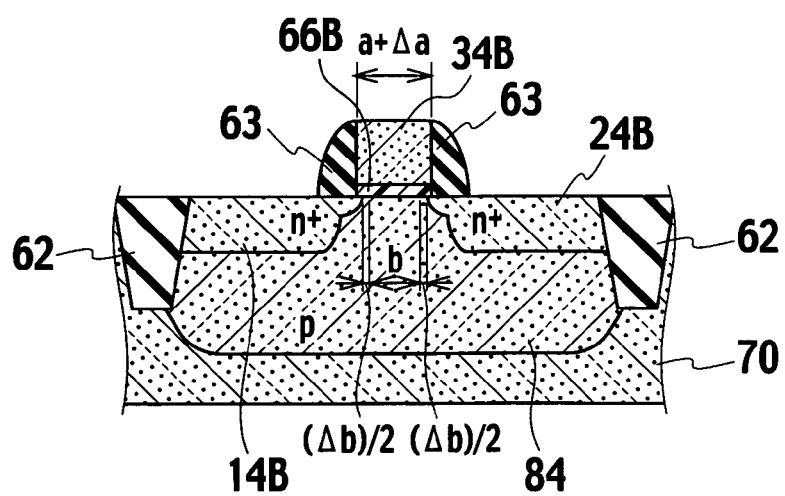
FIG. 8 is a third cross sectional view of the transistor in accordance with the embodiment of the present invention.

FIG. 8 is a sectional view taken on line VIII—VIII in FIG. 7. FIG. 8 shows the adjusted structure of the second n-channel transistor simulated by the simulator 201 shown in FIG. 1 based on the adjusted design data, the conditions for the ion implantation, and the conditions for the annealing process. Here, the adjusted second n-channel transistor includes the semiconductor substrate 70, the trench isolation region 62 provided in the semiconductor substrate 70, the p-well 84 provided in the semiconductor substrate 70 in the region surrounded by the trench isolation region 62, a gate insulator 66B disposed on the p-well 84, the gate electrode 34B disposed on the gate insulator 66B, the insulating sidewall spacer 63 disposed on the sidewalls of the gate electrode 34B, and the first and second n$^+$ diffusion regions 14B and 24B self aligned in the p-well 84 by the gate electrode 34B.

Figure 9:
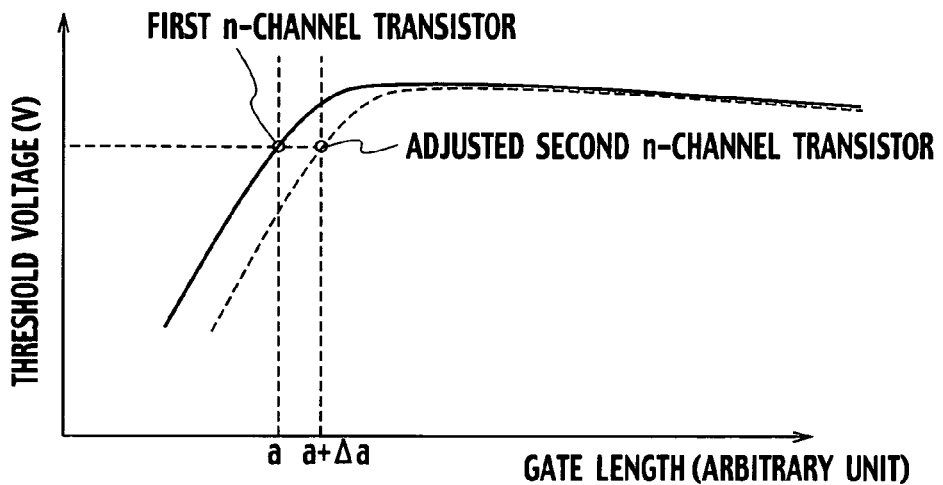
FIG. 9 is a second sample graph showing the threshold voltage of the transistor in accordance with the embodiment of the present invention.

It should be noted that the effective channel length of the adjusted second n-channel transistor is increased toward the trench isolation region 62 by "(Δb)/2" on each side due to the increased gate length "a+Δa" of the gate electrode 34B. Therefore, a significant difference between the effective channel length of the adjusted second n-channel transistor and the effective channel length of the first n-channel transistor as the reference channel length shown in FIG. 3 is reduced. Accordingly, the threshold voltage of the adjusted second n-channel transistor is almost equal to the threshold voltage of the first n-channel transistor as shown in FIG. 9.

With reference again to FIG. 1, the verification tool 251 is configured to predict the projected image of a mask pattern on a wafer. Such mask pattern contains a pattern corresponding to the gate electrode adjusted by the adjuster

400. The verification tool 251 verifies the optical proximity effect that generates when an image of the photomask is projected onto the wafer.

Figure 10:
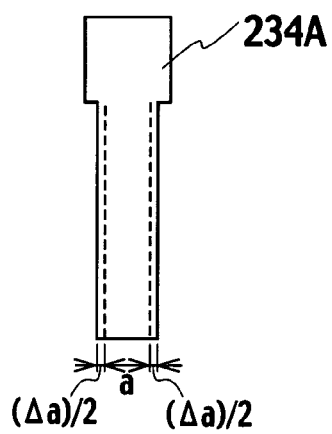
FIG. 10 is a first mask pattern for a gate electrode in accordance with the embodiment of the present invention.
Figure 11:
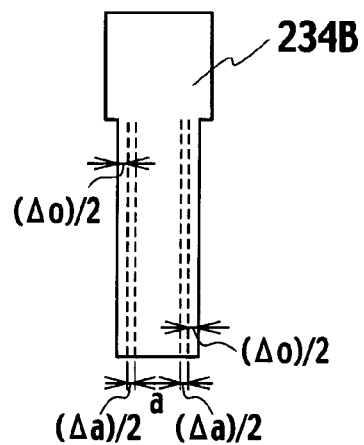
FIG. 11 is a second mask pattern for the gate electrode in accordance with the embodiment of the present invention.

The optical proximity correction module 120 is configured to apply the optical proximity correction (OPC) to the design data of the gate electrode based on the result from the verification tool 251. When the verification tool 251 predicts that the length of the projected image of gate electrode in the design data 234A shown in FIG. 10 is decreased in the gate length direction by "($\Delta$o)/2" on each side, for example, the optical proximity correction module 120 increases the length of the gate electrode in the design data 234B by "($\Delta$o)/2" on each side as shown in FIG. 11. The mask data memory 306 shown in FIG. 1 stores the design data corrected by the optical proximity correction module 120.

A keyboard, a mouse, a flexible drive, a CD-ROM drive, a DVD-ROM drive, and a MO drive may be used for the input unit 301. An LCD, an LED, and a network connector such as the LAN port may be used for the output unit 302. The program memory 303 stores a program instructing the CPU 100 to transfer data with apparatuses connected to the CPU 100. The temporary memory 304 stores temporary data calculated during operation by the CPU 100.

Figure 12:
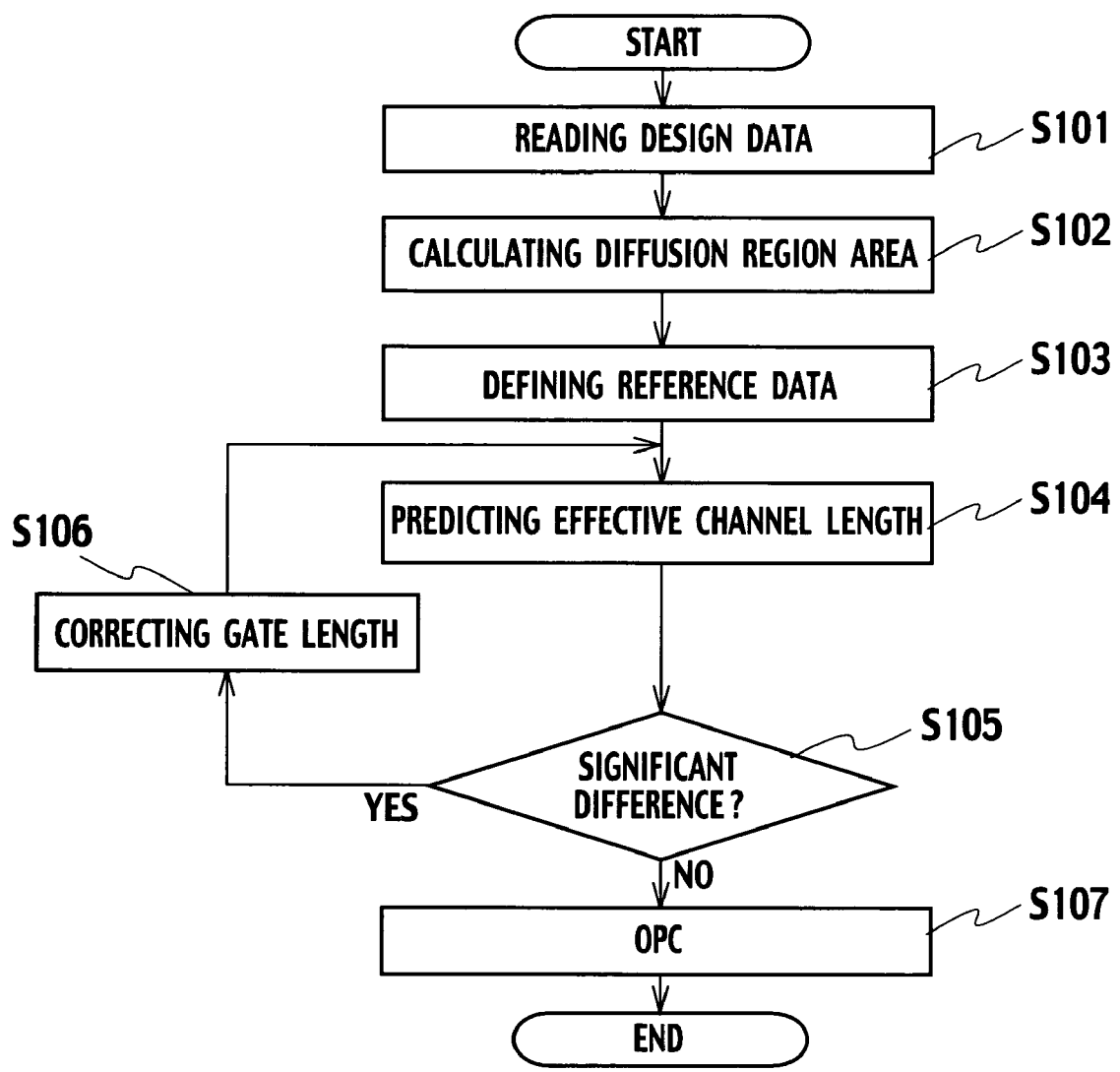
FIG. 12 is a flowchart depicting a computer implemented method for designing a semiconductor integrated circuit in accordance with the embodiment of the present invention.

With reference to FIG. 12, a computer implemented method for designing the semiconductor integrated circuit according to the embodiment of the present invention is described.

In step S101, the data interface 111 shown in FIG. 1 fetches the plurality of design data of the plurality of transistors from the design data memory 305. Transferring the design data of the transistors from the input unit 111 to the data interface 111 is an alternative. In step S102, the area calculator 101 calculates the surface areas of the diffusion regions of the respective transistors by using the design data fetched by the data interface 111. Thereafter, the area calculator 101 stores the calculated surface areas in the temporary memory 304.

In step S103, the reference data defining module 102 fetches the plurality of design data from the design data memory 305. Then, the reference data defining module 102 defines the design data of the transistor of which the length of the diffusion region in the gate length direction is the shortest as the reference data. Thereafter, the reference data defining module 102 stores the reference data in the temporary memory 304.

In step S104, the adjuster 400 transfers the plurality of the design data of the plurality of the transistors fetched by the data interface 111 in step S101 to the simulator 201. The simulator 201 simulates each effective channel length of the plurality of the transistors manufactured using the ion implantation and the annealing based on the length of the diffusion region in the gate length direction and the surface area of the diffusion region stored in the temporary memory 304.

In step S105, the adjuster 400 judges whether a significant difference between the reference channel length simulated by the simulator 201 based on the reference data and each of the effective channel lengths simulated by the simulator 201 based on the design data of the transistors exists or not. When the adjuster 400 judges a significant difference exists, step S106 is a next procedure.

In step S106, the adjuster 400 adjusts gate lengths of the gate electrodes contained in the design data of the transistors to reduce a significant difference. The adjuster 400 stores the adjusted design data of the gate electrode in the temporary memory 304. When the adjuster 400 judges a significant difference does not exist, step S107 is a next procedure.

In step S107, the verification tool 251 verifies the change of the line width of the gate electrode generated by the OPE. If the change of the line width is significant, the optical proximity correction module 120 corrects the design data of the gate electrode. Thereafter, the optical proximity correction module 120 stores the corrected design data in the mask data memory 306.

As described above, the semiconductor integrated circuit design tool shown in FIG. 1 and the computer implemented method for designing the semiconductor integrated circuit shown in FIG. 12 adjust the gate length of the gate electrode based on each surface area and each length of the diffusion regions in the gate length direction contained in the design data of the plurality of the transistors. Therefore, the semiconductor integrated circuit design tool and the computer implemented method for designing the semiconductor integrated circuit according to the embodiment of the present invention make it possible to unify the effective channel lengths of the plurality of the transistors in the semiconductor integrated circuit. Consequently, the plurality of the transistors of which electrical characteristics per unit channel length such as the threshold voltage, and the leakage current are unified are provided. Accordingly, there is no need to allow for the dispersion of the manufactured transistors when the transistors are designed, which makes it possible to shrink the size of the semiconductor integrated circuit and accelerate the manufacturing process for the semiconductor integrated circuit.

Figure 13:
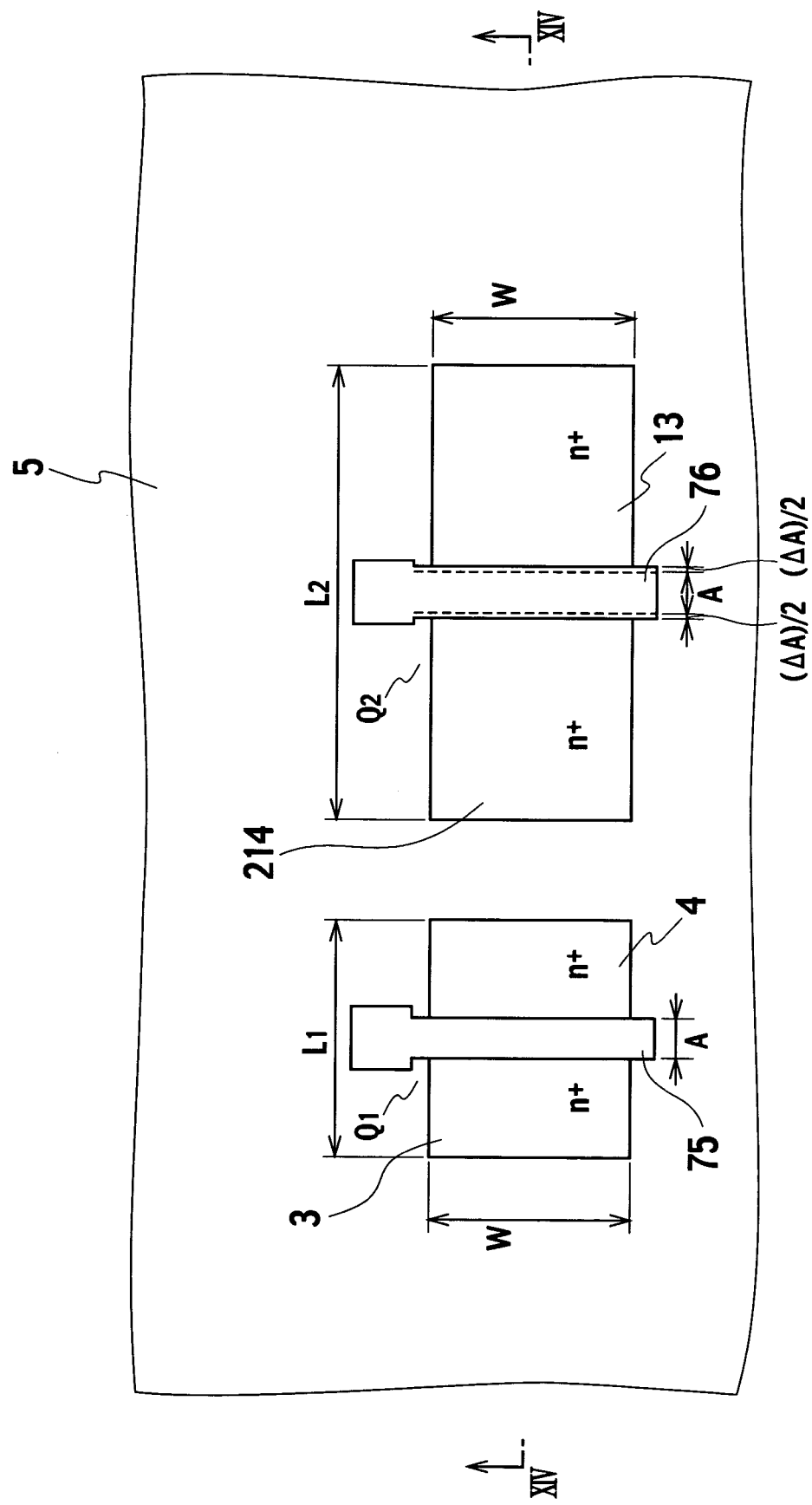
FIG. 13 is a top view of the semiconductor integrated circuit in accordance with the embodiment of the present invention.
Figure 14:
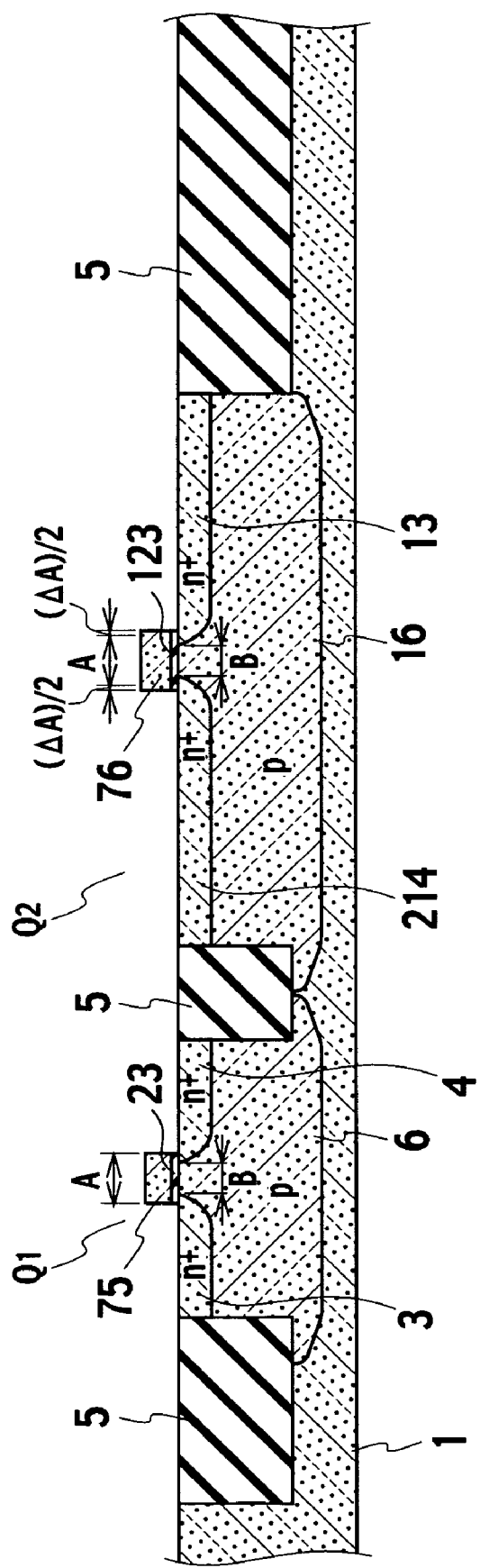
FIG. 14 is a cross sectional view of the semiconductor integrated circuit in accordance with the embodiment of the present invention.
Figure 15:
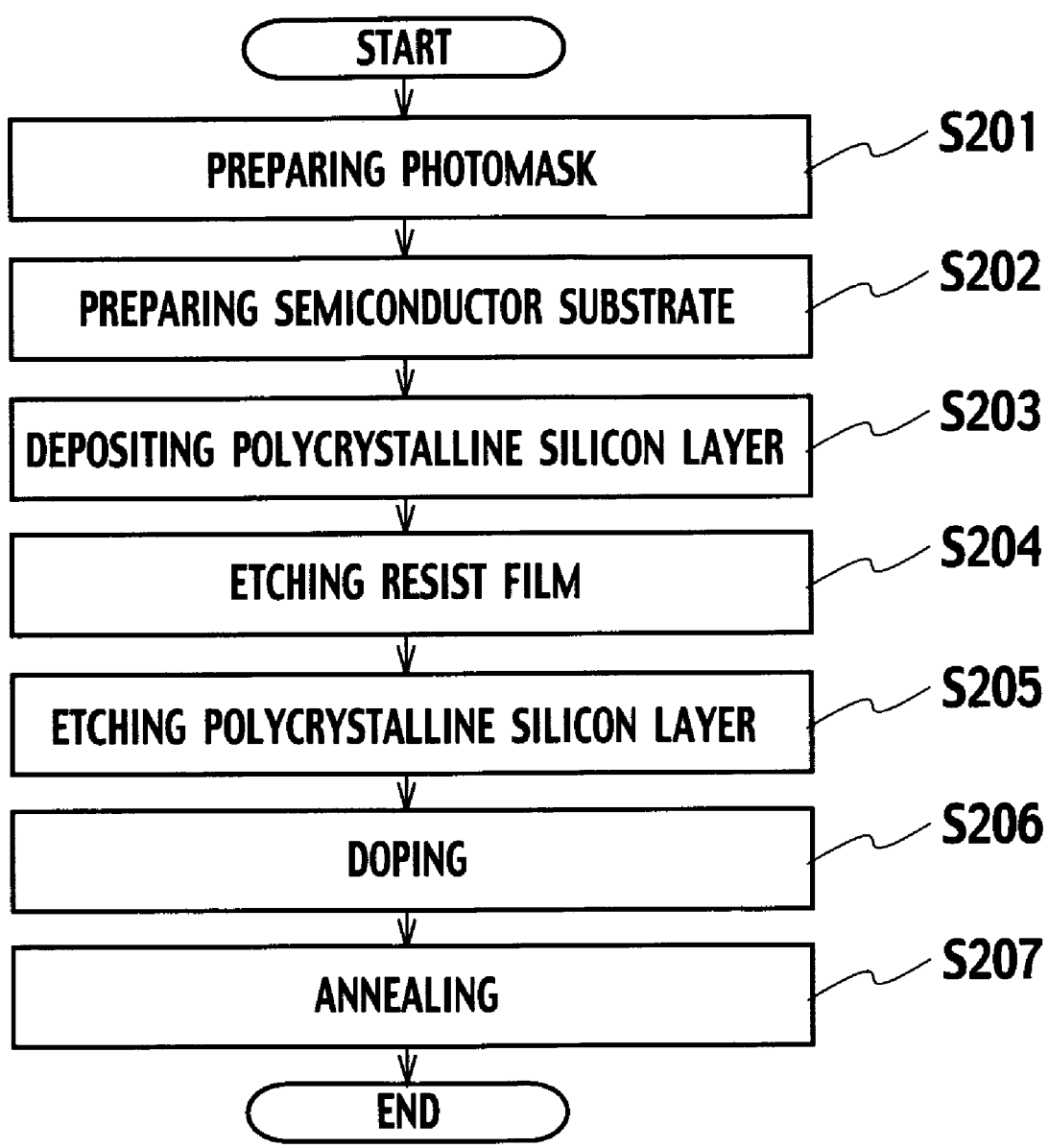
FIG. 15 is a flowchart depicting a method for manufacturing the semiconductor integrated circuit in accordance with the embodiment of the present invention.

With reference to FIG. 13 and FIG. 14 which is a sectional view taken on line XIV—XIV in FIG. 13, the semiconductor integrated circuit in accordance with the embodiment of the present invention has a semiconductor substrate 1, and an n-channel transistor $Q_1$ provided in the semiconductor substrate 1, an n-channel transistor $Q_2$ provided in the semiconductor substrate 1, a trench isolation region 5 surrounding the n-channel transistor $Q_1$ and $Q_2$. The length of the diffusion region in the gate length direction of the n-channel transistor $Q_1$ is different from the length of the diffusion region in the gate length direction of the n-channel transistor $Q_2$.

The n-channel transistor $Q_1$ has a p-well 6 provided in the semiconductor substrate 1, a gate insulator 23 disposed on the p-well 6, a gate electrode 75 disposed on the gate insulator 23, and the source and drain regions 3 and 4 self aligned in the p-well 6 by the gate electrode 75.

The n-channel transistor $Q_2$ has a p-well 16 provided in the semiconductor substrate 1, a gate insulator 123 disposed on the p-well 16, a gate electrode 76 disposed on the gate insulator 123, and the source and drain regions 13 and 214 self aligned in the p-well 16 by the gate electrode 76.

As shown in FIG. 13, each of the source region 3 and the drain region 4 in the n-channel transistor $Q_1$ has the gate width "W". Each of the source region 13 and the drain region 214 in the n-channel transistor $Q_2$ also has the gate width "W". However, the length of the n-channel transistor $Q_1$ in the gate length direction is "$L_1$". On the contrary, the length of the n-channel transistor $Q_2$ in the gate length direction is "$L_2$". Here, "$L_2$" is twice as long as "$L_1$". In addition, the gate electrode 75 in the n-channel transistor $Q_1$ has the gate length "A". On the contrary, the gate electrode 76 in the n-channel transistor $Q_2$ has the gate length "A+$\Delta$A". Therefore, the gate length of the gate electrode 76 is longer by "($\Delta$A)/2" on each side in comparison with the gate length of the gate electrode 75. Since the gate length of the gate electrode 76 is adjusted, the effective channel length "B" of the n-channel transistor $Q_1$ is equal to the effective channel length "B" of the n-channel transistor $Q_2$ as shown in FIG. 14. Accordingly, there is no significant difference between the electrical characteristics per unit channel length of the n-channel transistor $Q_1$ and the n-channel transistor $Q_2$.

With reference to FIGS. 15–20, a method for manufacturing the semiconductor integrated circuit shown in FIGS. 13 and 14 according to the embodiment of the present invention is described.

Figure 16:
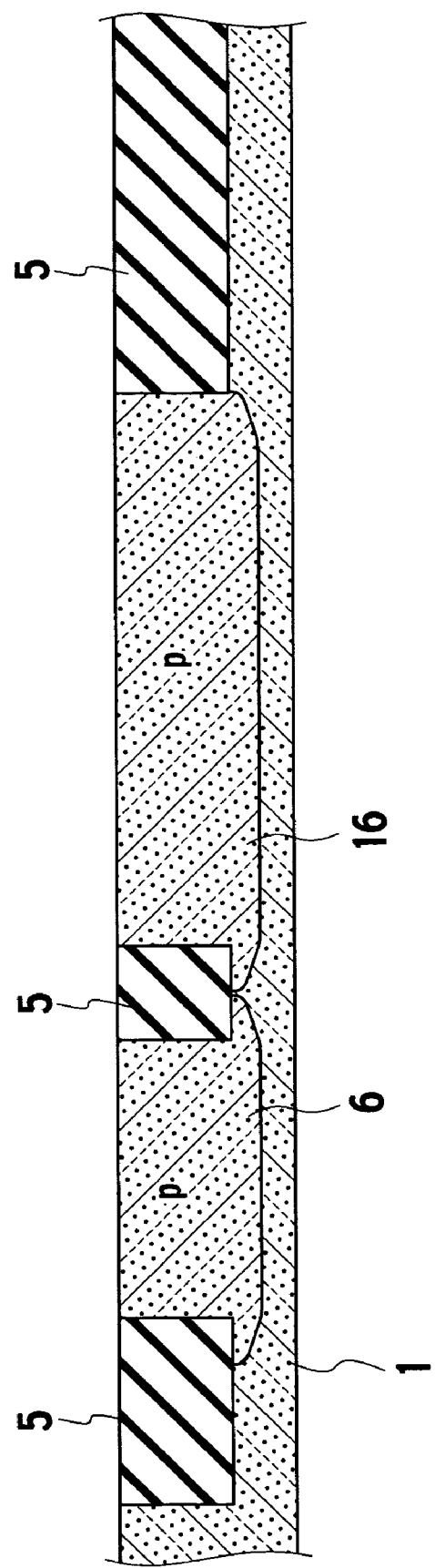
FIG. 16 is a first sectional view of the semiconductor integrated circuit depicting a manufacturing process in accordance with the embodiment of the present invention.

In step S201, the mask pattern for manufacturing the semiconductor integrated circuit is prepared. The mask pattern contains the gate electrode patterns of which gate lengths are adjusted by the method shown in FIG. 12. Thereafter, a photomask having the mask pattern is manufactured. In step S202, the trench isolation region 5 is formed in the semiconductor substrate 1 as shown in FIG. 16. Then, the p-well 6 and the p-well 16 are formed in the semiconductor substrate 1. The p-well 6 and the p-well 16 are surrounded by the trench isolation region 5.

Figure 17:
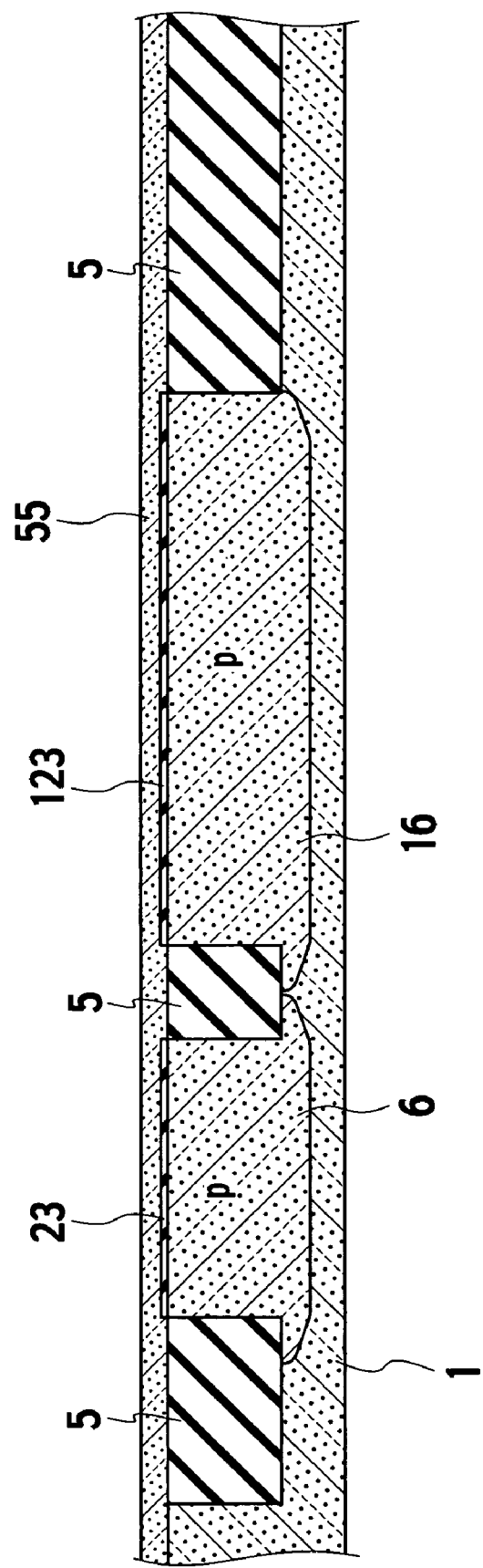
FIG. 17 is a second sectional view of the semiconductor integrated circuit depicting the manufacturing process in accordance with the embodiment of the present invention.

In step S203, as shown in FIG. 17, the gate insulator 23 on the p-well 6 and the gate insulator 123 on the p-well 16 are grown by thermal oxidation, respectively. Thereafter, a polycrystalline silicon layer 55 as a conductive layer is deposited on the semiconductor substrate 1 by the Chemical Vapor Deposition (CVD) process.

Figure 18:
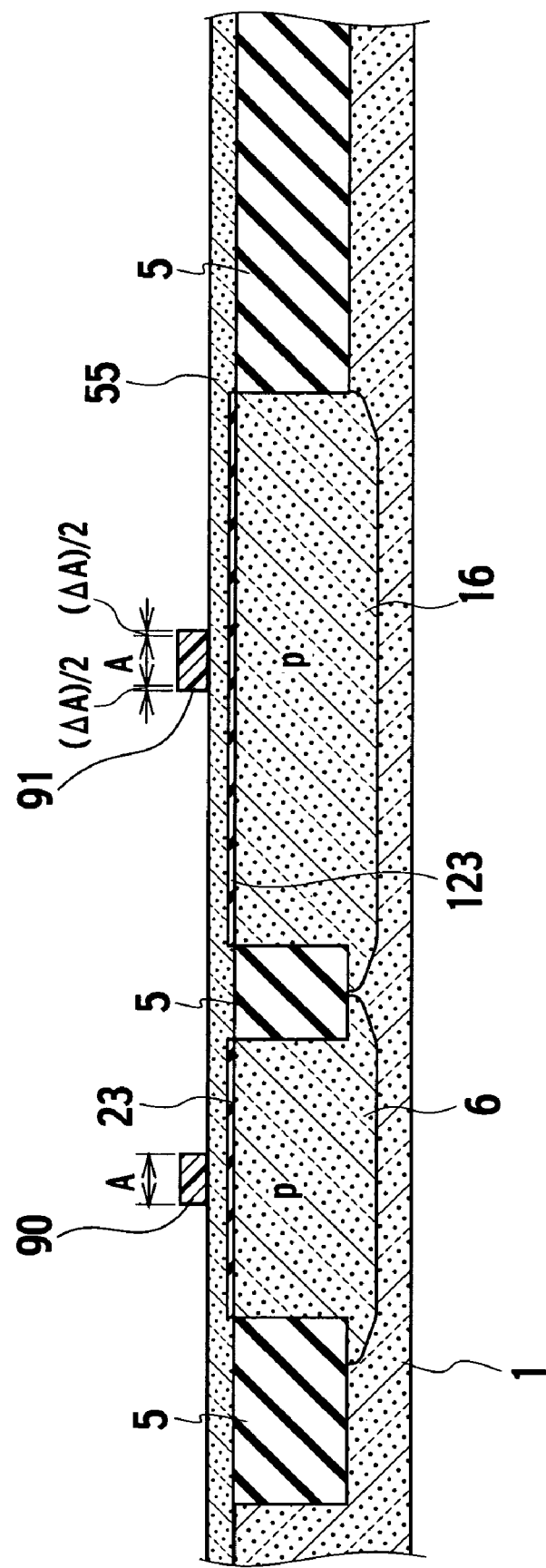
FIG. 18 is a third sectional view of the semiconductor integrated circuit depicting the manufacturing process in accordance with the embodiment of the present invention.

In step S204, a resist film is coated on the polycrystalline silicon layer 55. Subsequently, the resist film is exposed to light through the photomask prepared in step S201. In FIG. 18, the resist film is discriminately dissolved by the develop process and chemical etching masks 90 and 91 are formed on the polycrystalline silicon layer 55. Here, the length of the chemical etching mask 90 in the gate length direction is "A". The length of the chemical etching mask 91 in the gate length direction is "A+ΔA". The length of the chemical etching mask 91 is longer than the length of the chemical etching mask 90 by "(ΔA)/2" for each direction.

Figure 19:
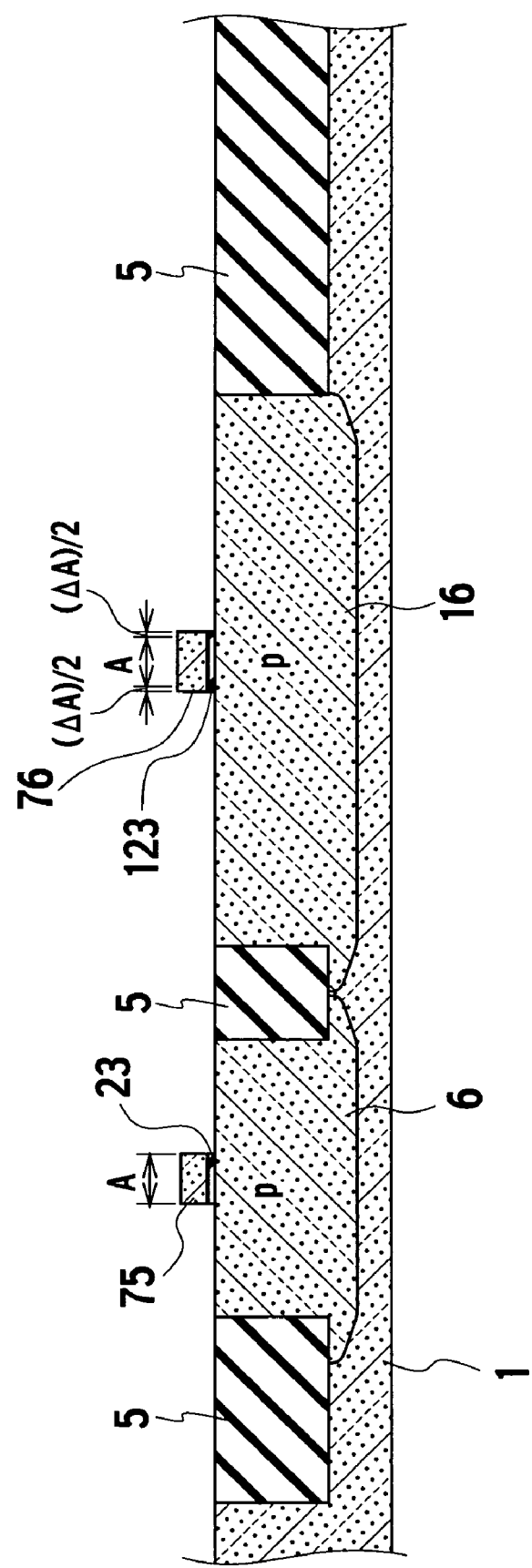
FIG. 19 is a fourth sectional view of the semiconductor integrated circuit depicting the manufacturing process in accordance with the embodiment of the present invention.

In step S205, as shown in FIG. 19, the polycrystalline silicon layer 55 wherever the resist film is removed is discriminately etched by use of the optical lithography and the reactive ion etching (RIE) process. Consequently, the gate electrodes 75, 75 are formed. Here, the gate length of the gate electrode 75 formed on the p-well 6 is "A". On the contrary, the gate length of the gate electrode 76 formed on the p-well 16 is "A+ΔA". The gate length of the gate electrode 76 is longer than the gate length of the gate electrode 75 by "(ΔA)/2" for each direction.

Figure 20:
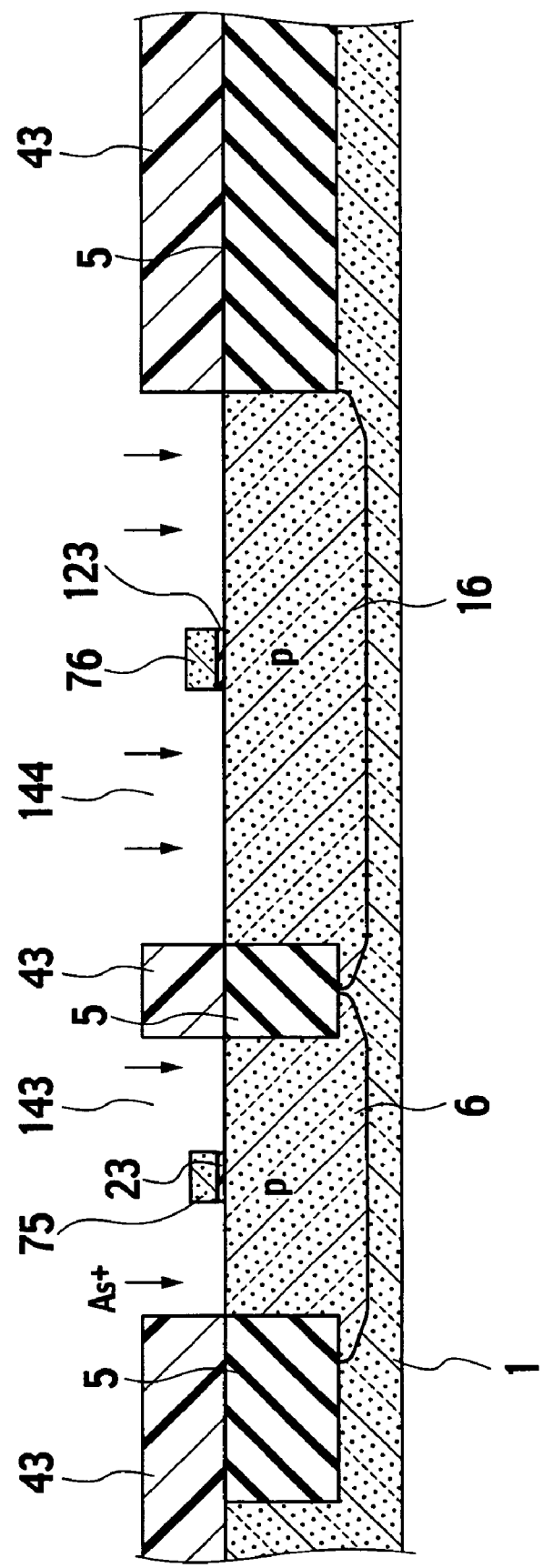
FIG. 20 is a fifth sectional view of the semiconductor integrated circuit depicting the manufacturing process in accordance with the embodiment of the present invention.

In step S206, as shown in FIG. 20, a resist film 43 is coated on the semiconductor substrate 1. Thereafter, openings 143 and 144 are delineated in the resist film 43 by use of the lithography process. Then, the p-well 6 and the p-well 16 exposed by the openings 143 and 144 are selectively doped with N-type dopants such as phosphorus ($P^+$) and arsenic ($As^+$) using the gate electrodes 75 and 76 as the doping mask. Then, resist film 43 is removed by the ash process. In step S207 the annealing process is employed to activate and diffuse the doped dopants in the p-wells 6 and 16. Consequently, the semiconductor integrated circuit shown in FIGS. 13 and 14 is obtained.

As described above, the method for manufacturing the semiconductor integrated circuit in accordance with the embodiment of the present invention makes it possible to unify the effective channel lengths of the transistors even though the transistors have different lengths of the diffusion regions in the gate length direction. In an earlier method, the OPC method is employed to unify the gate lengths of the gate electrodes in the semiconductor integrated circuits. However, it is difficult to unify the effective channel lengths of the transistors of which lengths of the diffusion regions in the gate length direction are different from each other. On the contrary, the method for manufacturing the semiconductor integrated circuit in accordance with the embodiment makes it possible to unify the effective channel lengths of the transistors even though the plurality of transistors have different lengths of the diffusion regions in the gate length direction. Therefore, it is possible to unify the electrical characteristics per the unit channel length of the transistors.

(Other Embodiments)

Although an invention has been described above by reference to the embodiment of the present invention, the present invention is not limited to the embodiment described above. Modifications and variations of the embodiment described above will occur to those skilled in the art, in the light of the above teachings. For example, in the embodiment described above, the tool shown in FIG. 1 and the method shown in FIG. 12 are employed to adjust the gate length of the gate electrode 34A in the second n-channel transistor, where the single gate electrode 34A is disposed as shown in FIG. 4. However, the tool and the method according to the embodiment are also useful in adjusting the design data of the transistor having a plurality of gate electrodes 40A, 41, 42A shown in FIG. 21.

Figure 21:
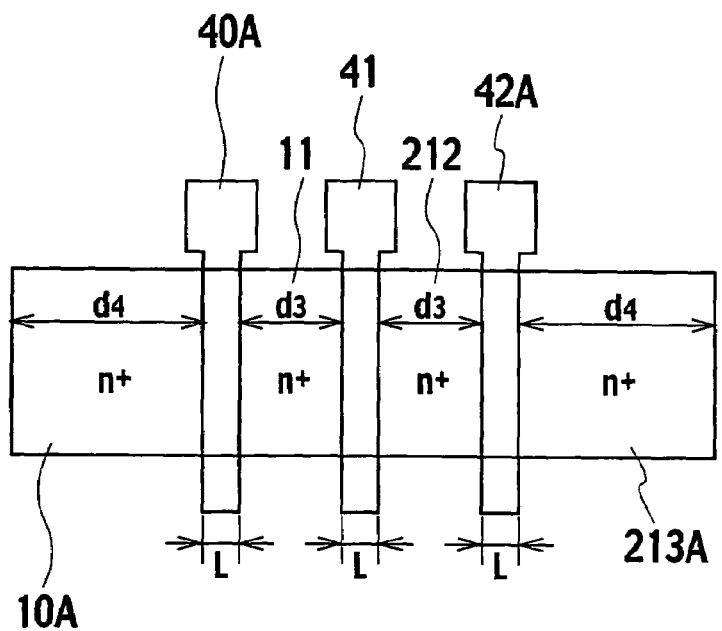
FIG. 21 is a first design data of the transistor in accordance with another embodiment of the present invention.

The design data of the transistor shown in FIG. 21 contains the parallel gate electrodes 40A, 41, 42A, a first $n^+$ diffusion region 10A adjacent to the gate electrode 40A, a second $n^+$ diffusion region 11 between the gate electrodes 40A and 41, a third $n^+$ diffusion region 212 between the gate electrodes 41 and 42A, and a fourth $n^+$ diffusion region 213A adjacent to the gate electrode 42A. Each gate length of the gate electrodes 40A, 41, 42A is "L" at the mask level. Each length of the first and the fourth $n^+$ diffusion regions 10A and 213A in the gate length direction is "$d_4$". Each length of the second and the third $n^+$ diffusion regions 11 and 212 in the gate length direction is "$d_3$" that is shorter than "$d_4$".

In this case, the simulator 201 shown in FIG. 1 simulates the each effective channel length for the gate electrodes 40A, 41, 42A after the doped dopants are activated and diffused in the first to fourth $n^+$ diffusion regions 10A, 11, 212, and 213A based on the design data shown in FIG. 21. When the simulator 201 simulates the effective channel lengths, the simulator 201 incorporates the design where one edge of the first $n^+$ diffusion region 10A is in contact with the trench isolation and another edge of the first $n^+$ diffusion region 10A is in contact with the gate electrode 40A in the gate length direction as the restriction factor of the diffusion. Also, the simulator 201 incorporates the design where one edge of the second $n^+$ diffusion region 11 is in contact with the gate electrode 40A and another edge of the second $n^+$ diffusion region 11 is in contact with the gate electrode 41 in the gate length direction as the restriction factor of the diffusion. As for the third $n^+$ diffusion region 212, the simulator 201 incorporates the design where one edge is in contact with the gate electrode 41 and another edge is in contact with the gate electrode 42A in the gate length direction as the restriction factor of the diffusion. As for the fourth $n^+$ diffusion region 213A, the simulator 201 incorporates the design where one edge is in contact with the gate electrode 42A and another edge is in contact with the trench isolation region in the gate length direction as the restriction factor of the diffusion.

Figure 22:
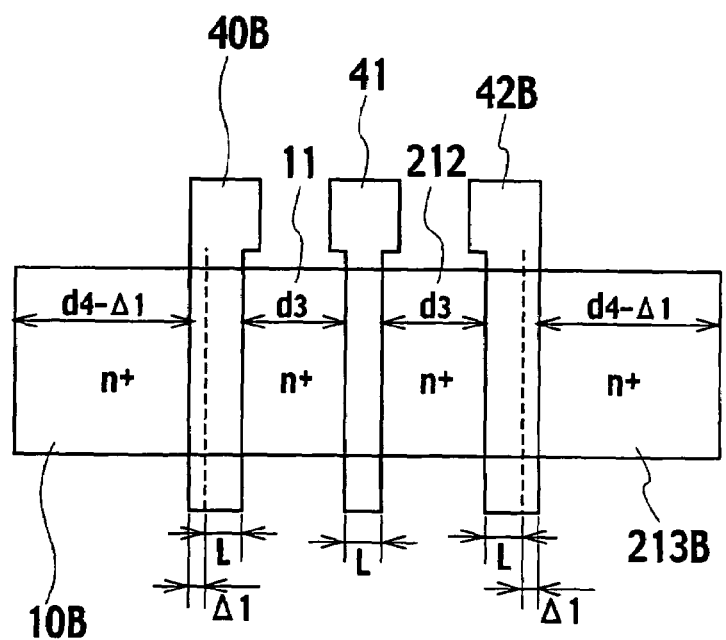
FIG. 22 is a second design data of the transistor in accordance with another embodiment of the present invention.

If the simulator 201 simulates that each effective channel length for the gate electrode 40A and 42A is shorter than the effective channel length for the gate electrode 41, for example, the adjuster 400 shown in FIG. 1 adjusts the design data as shown in FIG. 22. The adjusted design data for the transistor contains gate electrodes 40B, 41, 42B, a first $n^+$ diffusion region 10B, a second n⁺ diffusion region 11, a third n⁺ diffusion region 212, and a fourth n⁺ diffusion region 213B. Here, each of the gate electrodes 40B and 42B is increased by "L+Δl" and each length of the first and fourth n⁺ diffusion regions 10B and 213B in the gate length direction is decreased from "$d_4$" to "$d_4-\Delta l$" based on the simulated effective channel length. Therefore, the transistor manufactured by using the adjusted design data shows no significant difference in the effective channel length for each of the gate electrodes 40A, 41, 42. As described above, the present invention includes many variations of embodiments. Therefore, the scope of the invention is defined with reference to the following claims.

What is claimed is:

1. A semiconductor integrated circuit design tool, comprising:
    a reference data defining module that defines design data of one of a plurality of transistors implementing the semiconductor integrated circuit as reference data;
    a simulator that simulates each effective channel length of the transistors based on the design data and a reference channel length based on the reference data; and
    an adjuster that adjusts gate lengths of gate electrodes of the transistors to reduce a difference between the effective channel length and the reference channel length.

2. The tool of claim 1, further comprising an area calculator that calculates surface areas of diffusion regions of the transistors, based on the design data.

3. The tool of claim 2, wherein a length in a gate length direction of the diffusion region in the reference data is the shortest length among the design data.

4. The tool of claim 1, wherein the effective channel length is simulated based on a length in a gate length direction of diffusion regions of the transistors.

5. The tool of claim 2, wherein the effective channel length is simulated based on the surface areas of the diffusion regions.

6. The tool of claim 1, wherein the effective channel length is simulated based on conditions for an ion implantation process for forming diffusion regions of the transistors.

7. The tool of claim 1, wherein the effective channel length is simulated based on conditions for an annealing process for forming diffusion regions of the transistors.

8. The tool of claim 1, further comprising an optical proximity correction module that applies an optical proximity correction to a pattern of the gate electrode.

9. A computer implemented method for designing semiconductor integrated circuit, comprising:
    defining design data of one of a plurality of transistors implementing the semiconductor integrated circuit as reference data;
    simulating each effective channel length of the transistors based on the design data and a reference channel length based on the reference data; and
    adjusting gate lengths of gate electrodes of the transistors to reduce a difference between the effective channel length and the reference channel length.

10. The method of claim 9, further comprising calculating surface areas of diffusion regions of the transistors based on the design data.

11. The method of claim 10, wherein a length in a gate length direction of the diffusion region in the reference data is the shortest length among the design data.

12. The method of claim 9, wherein the effective channel length is simulated based on a length in a gate length direction of diffusion regions of the transistors.

13. The method of claim 10, wherein the effective channel length is simulated based on the surface areas of the diffusion regions.

14. The method of claim 9, wherein the effective channel length is simulated based on conditions for an ion implantation process for forming diffusion regions of the transistors.

15. The method of claim 9, wherein the effective channel length is simulated based on conditions for an annealing process for forming diffusion regions of the transistors.

16. The method of claim 9, further comprising applying an optical proximity correction to a pattern of the gate electrode.

17. A method for manufacturing a semiconductor integrated circuit, comprising:
    forming a gate insulator on a semiconductor substrate;
    depositing a conductive layer on the gate insulator;
    coating a resist film on the conductive layer;
    projecting an image of a photomask onto the resist film to form etching masks on the conductive layer, the photomask having patterns of gate electrodes of which gate lengths are adjusted to reduce a difference between effective channel lengths of transistors implementing the semiconductor integrated circuit, based on designed lengths and designed surface areas of diffusion regions of the transistors;
    etching the conductive layer by using the etching masks to form the gate electrodes;
    doping dopants into the semiconductor substrate using the gate electrodes as a doping mask; and
    annealing the semiconductor substrate to activate the dopants to form the diffusion regions in the semiconductor substrate.

* * * * *